United States Patent [19]

Bluford, Jr. et al.

[11] 4,261,662
[45] Apr. 14, 1981

[54] METHOD AND APPARATUS FOR MEASURING THE RELATIVE INTENSITY OF THE BEAMS EMANATING FROM A SINGLE LASER

[75] Inventors: Benjamin L. Bluford, Jr., Fair Haven; Alexander G. Mondrick, Jr., Wall Township, Monmouth County; Milan Schwartz, Ocean Township, Monmounth County, all of N.J.

[73] Assignee: The United States of America as represented by the Secretary of the Army, Washington, D.C.

[21] Appl. No.: 1,114

[22] Filed: Jan. 5, 1979

[51] Int. Cl.³ ............................................. G01J 1/00
[52] U.S. Cl. ................................... 356/121; 356/399
[58] Field of Search ............... 356/121, 399, 400, 401, 356/225

[56] References Cited

U.S. PATENT DOCUMENTS

| | | | |
|---|---|---|---|
| 3,706,498 | 12/1972 | Peacher | 356/121 |
| 3,752,588 | 8/1973 | Chapman | 356/399 |
| 3,799,674 | 3/1974 | Guillet et al. | 356/399 |
| 3,813,171 | 5/1974 | Teach et al. | 356/399 |
| 3,813,172 | 5/1974 | Walker et al. | 356/225 |
| 3,867,036 | 2/1975 | Detwiler et al. | 356/121 |

Primary Examiner—Richard A. Rosenberger
Attorney, Agent, or Firm—Nathan Edelberg; Jeremiah G. Murray; Daniel D. Sharp

[57] ABSTRACT

The laser beam to be measured is focussed onto a photographic film to record the beam pattern. A second laser beam is then used to measure the displacement of the side lobes from the main beam. An apertured metal plate is then substituted for the film and, by the use of a beam deflector and a calorimeter, the intensity of the main beam alone is measured. Using the beam displacement data previously recorded, the metal plate is then moved to co-incide with one of the side lobes and the intensity of the side lobe recorded. This procedure is repeated for all remaining side lobes.

6 Claims, 2 Drawing Figures

METHOD AND APPARATUS FOR MEASURING THE RELATIVE INTENSITY OF THE BEAMS EMANATING FROM A SINGLE LASER

GOVERNMENT LICENSE

The invention described herein may be manufactured and used by or for the Government for governmental purposes without the payment of any royalties thereon or therefor.

BACKGROUND OF THE INVENTION (a) Field of the Invention

Broadly speaking, this invention relates to lasers. More particularly, in a preferred embodiment, this invention relates to methods and apparatus for measuring the intensity of the side lobes in a laser beam.

(b) Discussion of the Prior Art

In apparatus using solid state lasers, the presence of relatively strong side lobe beams gives erroneous data, which may lead to a degradation of the system performance. It is, therefore, important to be able to select lasers with low sidebeam intensities.

In conventional tests of laser beam intensity, the laser beam is typically directed toward a diffuse reflector, for example, magnesium oxide or barium sulphate. The surface normal and the laser beam direction are made collinear. At a small angle from the surface normal, and at some convenient distance, a detector system, with known response characteristics, is used to determine the laser beam energy and/or the laser beam power. If the angular separation between the side lobes and the main beam is small, the side-lobe beams can be relfected off the diffuse reflector which leads to an erroneous interpretation of the main beam energy. If the angular separation between the side lobes and the main beam is large, the side lobes are not reflected from the diffuse reflector, but their generally unknown direction prevents measurement of their beam energies. This is particularly true for high-intensity, short-duration laser pulses in a spectral region where the radiation evokes little or no visible response, but can cause physiological damage to the unprotected eye.

SUMMARY OF THE INVENTION

As a solution to these and other problems, the invention disclosed and claimed herein comprises a technique for measuring the intensity of the side lobes in a laser beam. Briefly, the main and side lobe distribution of a laser is recorded on a photographic emulsion. Then, using a second laser beam as a reference source, the location of the side-lobe beams relative to the main beam is noted. Next, using a series of apertured metal plates and the above-noted side-lobe locations, the intensity of the main beam, as well as each of the side lobes, is measured, as desired.

The invention and its mode of operation will be more fully understood from the following detailed description, when taken with the appended drawing in which:

DETAILED DESCRIPTION OF THE INVENTION

Figure 1:
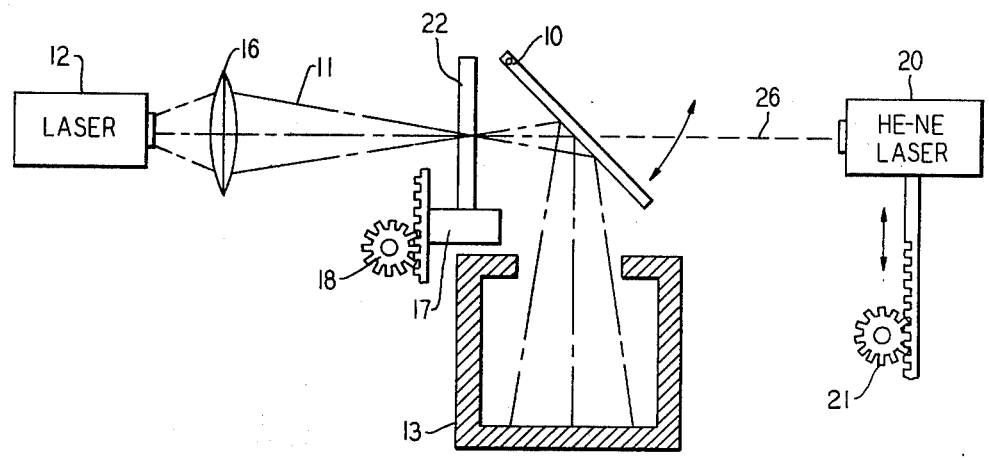
FIG. 1 is partially a schematic drawing of an illustrative side-lobe beam measuring apparatus according to the invention.

As shown in FIG. 1, one form of apparatus which is suitable for measuring the intensity of the side lobes in a laser beam comprises a beam deflector 10, illustratively a mirrored surface, which deflects the beam 11 from the laser 12 to be measured, into a calorimeter 13 or other suitable measuring device. A lens 16, preferably of long focal length, focusses the beam from laser 12. A support 17 is positioned intermediate the laser 12 and the beam deflector 10 to intercept the laser beam 11. Support 17 carries a photo-sensitive member 22, for example, a glass photographic plate or a piece of Polaroid ® film rigidly held in a frame. The photo-sensitive emulsion of member 22 actually intercepts, and is destructively heated by, the laser beam 11. In that sense, member 22 acts more like a heat-sensitive member than a photo-sensitive member; however, since film is so inexpensive and readily available, it is an ideal choice for member 22. The plane of member 22 is held normal to the axis of beam 11. Lens 16 is adjusted so that laser beam 11 is focussed on the near surface of member 22. As will be subsequently explained, in operation, member 22 is removed from support 17 and an apertured metal plate 31 substituted therefor.

The apparatus shown in FIG. 1 further comprises a HeNe laser 20 which is connected to a rack and pinion gear 21, or other suitable mechanism, to provide precisely controlled movement of laser 20 in the vertical direction. A similar mechanism, not shown in the drawing to avoid clutter, provides precisely controlled movement of laser 20 in the horizontal direction, i.e., in and out of the paper.

A rack and pinion gear 18, or other suitable mechanism, is associated with support frame 17 to provide precisely controlled movement of the support in the vertical direction. A similar mechanism, not shown in the drawing to avoid clutter, provides precisely controlled movement of the support in the horizontal direction (i.e., in and out of the paper).

In operation, radiant power from laser 12 is focussed, by lens 16 onto the emulsion side of film 22. In a typical experiment, a single pulsed laser output was found to burn three holes in the film 22—one hole being due to main beam and the two smaller holes being due to side lobe beams. The beam deflector 10 directs the laser beams toward the beam absorber or calorimeter 13, or other suitable laser beam intensity measuring device. Next, laser 12 is de-activated and deflector 10 is removed, and the HeNe laser 20 turned on. The plane containing the X and Y axes of the linear translation table on which the HeNe laser is mounted is made parallel to film plane 22, that is to say HeNe laser beam 26 is made normal to this plane. X and Y adjustments are made until HeNe spot is centered on main beam burn hole on film 22. The X and Y coordinates of this center are noted for future reference.

The HeNe laser spot is used in a similar manner to determine the X and Y coordinates of each side lobe beam burn hole center. In particular, the X and Y coordinate differences between the main burn hole center and each side lobe beam burn hole center and recorded. Thus:

$$x_{\text{main beam}} - x_{\text{side lobe 1}} = x_1 \quad y_{\text{main beam}} - y_{\text{side lobe 1}} = y_1$$

$x_{\text{main beam}} - x_{\text{side lobe 2}} = x_2$  $y_{\text{main beam}} - y_{\text{side lobe 2}} = y_2$ Film 22 is now removed from support 17 and the diameter of each burn hole is measured. This can be conveniently done by using a calibrated magnifier. Then, a metal plate is prepared by drilling a hole through it. Advantageously, the size of the drilled hole is approximately 5% larger than the diameter of the main beam burn hole. The metal plate is put into the support frame 17 that previously held the film 22. As discussed, the support frame is mounted on a two-axis linear translation device, similar to that which supports HeNe laser 20. By moving the two associated rack and pinions, the support frame 17 is moved until the HeNe laser beam is centered on the hole in the metal plate. (A telescope mounted on HeNe translation device can be used for this.) Next, the HeNe laser is turned off and the beam deflector mirror placed back into position. The main beam from a single pulse output from laser 12 will now pass through the hole in the metal plate and be deflected into calorimeter 13. Now, the beam deflector is removed. Using the X and Y coordinate data previously gathered, the HeNe laser is moved so that its beam strikes the metal plate at the location of the side lobe beam center. Next, the metal plate is moved so that hole will be centered on the HeNe laser beam.

The beam deflector is then put back into place. A side lobe beam from a single pulse output of the laser 12 will now pass through the hole in the metal plate and be deflected into calorimeter 13, or other measuring device. A similar procedure is used to measure the remaining side lobe beams. The ratio of the intensity of each side lobe beam to the main beam can now be calculated.

Figure 2:
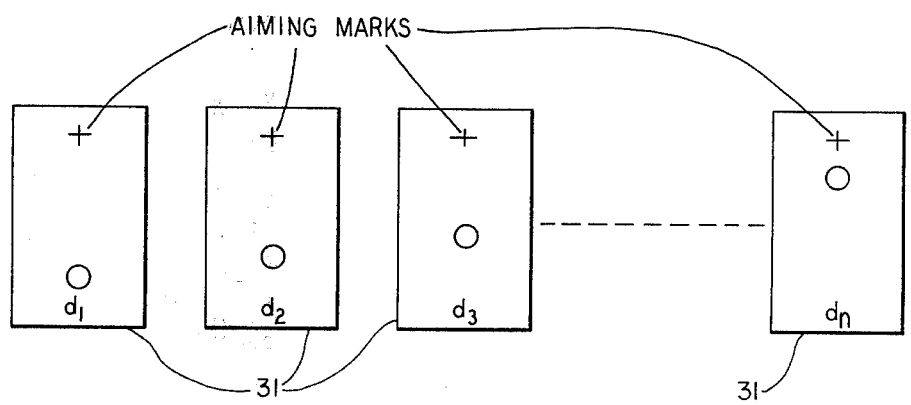
FIG. 2 depicts a series of n apertured metal plates suitable for measuring the side lobe intensities of an n-lobe laser using the apparatus of FIG. 1.

FIG. 2 depicts a plurality of metal plates $d_1$ through $d_n$ which may be used to measure the side lobe beam intensity of each of the lobes in an n-lobe laser beam pattern. It will be noted that the distance between each aperture and the aiming mark (main beam position) is different. Of course, each side lobe also has some lateral displacement, but that is taken care of by the rack and pinion gear.

One skilled in the art may make various changes and substitutions to the layout shown without departing from the spirit and scope of the invention.

What we claim is:

1. Apparatus for determining the comparative intensities of the main and auxiliary output beams from an energized first laser, which comprises:
    a film for revealing the spatial distribution of said output beams incident thereupon;
    a metal plate substitutable for said film containing an aperture through which one only of said output beams can pass at a given time;
    a support for holding first said film and next said apertured plate in the path of the output beams;
    means for moving said support and the supported plate along two orthogonal axes in a plane normal to the path of said output beams;
    means for measuring the energy content of an incident laser beam; and
    means positioned downstream of said support for deflecting successively given ones of said output beams passing through the aperture in said metal plate into said energy measuring means.

2. The apparatus according to claim 1 wherein said beam deflecting means includes means for moving said deflecting means out of the path of said output beams; and said apparatus further comprises
    a second laser for generating a visible laser beam normal to the plane of said film; and
    means for moving said second laser along two orthogonal axes in a plane normal to the path of said output beams.

3. A method of determining the comparative intensities of the main and auxiliary output beams from an energized first laser, which comprises the steps of:
    (a) determining the location of each of the discrete output beams by directing said beams upon the surface of a film to provide corresponding visible regions on the film, thereby to record the spatial distribution of said output beams;
    (b) selectively blocking all but one of the output beams whose position has been determined;
    (c) measuring the energy in said non-blocked output beam; and then
    (d) repeating steps (b) and (c) until the power of all output laser beam has been measured.

4. The method according to claim 3 wherein said location-determining step further comprises:
    (f) directing a visible laser beam from a second laser at one of the visible regions on said film resulting from impingement thereupon by the corresponding output beam by movement of said second lasers along two orthogonal axes in a plane normal to the path of said visible laser beam; and
    (g) successively and separately directing said visible laser beam at each of the other regions in the film resulting from impingement thereupon by the corresponding other output beams.

5. The method according to claim 4 wherein said blocking step comprises:
    (h) replacing said film with an apertured metal plate;
    (i) moving said second laser beam to the coordinates noted therefor when said visible laser beam was priorly directed at the visible region on said film resulting from impingement thereupon of a given one of said output beams;
    (j) aligning the aperture in said apertured plate with said visible laser beam; and
    (k) repeating steps (j) and (k) for the other of said output beams.

6. The method according to claim 5 further including
    (m) deflecting a given output beam passing through the aperture in said apertured plate to permit measurement of the energy thereof;
    (n) repeating step (m) for the other of said output beams.

* * * * *